United States Patent [19]

Bruhn

[11] 4,349,138
[45] Sep. 14, 1982

[54] CARRYING RACK FOR MOTORCYCLES

[76] Inventor: Andrew C. Bruhn, P.O. Box 594, Springfield, Oreg. 97477

[21] Appl. No.: 312,693

[22] Filed: Oct. 19, 1981

[51] Int. Cl.³ .............................................. B62J 7/04
[52] U.S. Cl. .............................. 224/30 R; 224/32 A; 224/39
[58] Field of Search ...................... 224/30 R, 31, 32 A, 224/36, 39, 41, 282; 248/214, 215, 222.2, 222.3, 223.3, 225.1

[56] References Cited

U.S. PATENT DOCUMENTS

| 1,460,760 | 7/1923 | McGee | 224/39 R |
| 4,230,245 | 10/1980 | Pold et al. | 224/39 |
| 4,257,544 | 3/1981 | Dierkes | 224/39 X |

Primary Examiner—Steven M. Pollard
Attorney, Agent, or Firm—Eugene M. Eckelman

[57] ABSTRACT

A mounting bracket supports a top platform arranged to carry a load. The mounting bracket has longitudinal extensions arranged to abut up against longitudinal frame portions of a motorcycle. A pair of fingers project upwardly from the longitudinal extensions for stabilizing the bracket laterally in the motorcycle frame. The mounting bracket also has an inverted channel member which fits on a horizontal frame portion of the motorcycle. The center of gravity of the mounting bracket is to the rear of the channel member whereby the rack holds itself on the motorcycle frame by rear weight causing the inverted channel to pivot around the horizontal frame portion of the motorcycle and the longitudinal extensions to abut up against frame portions of the motorcycle. The top platform is pivotally connected to the mounting bracket for tilting movement.

5 Claims, 4 Drawing Figures

CARRYING RACK FOR MOTORCYCLES

FIELD OF THE INVENTION

This invention relates to new and useful improvements in carrying racks and particularly pertains to a rack for use with motorcycles of the type having a frame comprised of a pair of parallel rearwardly extending portions and an inverted U-shaped connecting portion.

SUMMARY OF THE INVENTION

According to the present invention and forming a primary objective thereof, a carrying rack for motorcycles is provided which is simplified and lightweight in construction but sturdy in operation, which is easily applied to motorcycles having a particular type of rear frame extension, and which is tiltable for dumping a load.

For the purpose of carrying out the above objectives, a carrying rack is provided having a top load carrying platform connected to a body portion arranged for attachment to a motorcycle. The body portion has extended leg means arranged to abut against the underside rear frame portions of the motorcycle, and each of these leg means has pairs of projecting fingers arranged to straddle respective portions of the motorcycle frame for providing lateral stabilization. The body portion also has an inverted channel portion arranged to seat on the top of a U-shaped connecting portion of the rear frame of the motorcycle. By a preselected disposition of the center of gravity of the rack relative to the support channel, the rack holds itself in place by its own weight pivoting around the channel portion and holding the fingers in straddling relation with the motorcycle frame.

The invention will be better understood and additional objects and advantages will become apparent from the following description taken on connection with the accompanying drawings.

DETAILED DESCRIPTION OF A PREFERRED EMBODIMENT

Figure 1:
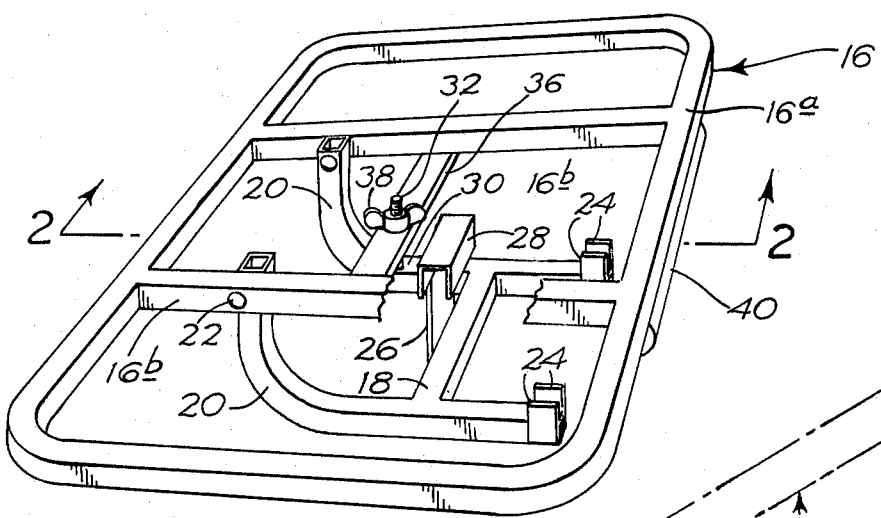
FIG. 1 is a perspective view of a carrying rack embodying the instant invention.
Figure 2:
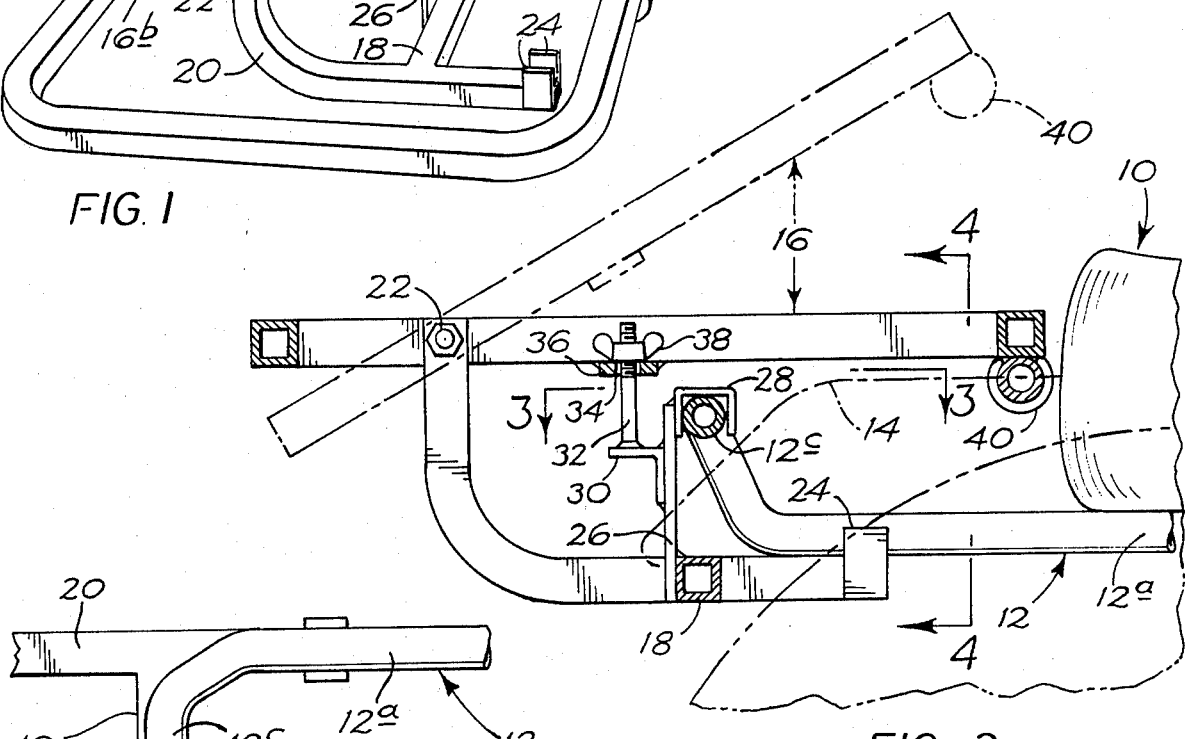
FIG. 2 is a side elevational view of the rack, a tilted position of the rack being shown in broken lines.
Figure 3:
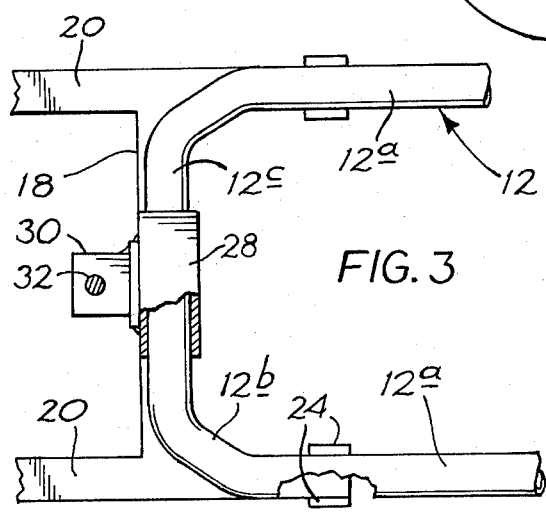
FIG. 3 is a fragmentary sectional view taken on the line 3—3 of FIG. 2.
Figure 4:
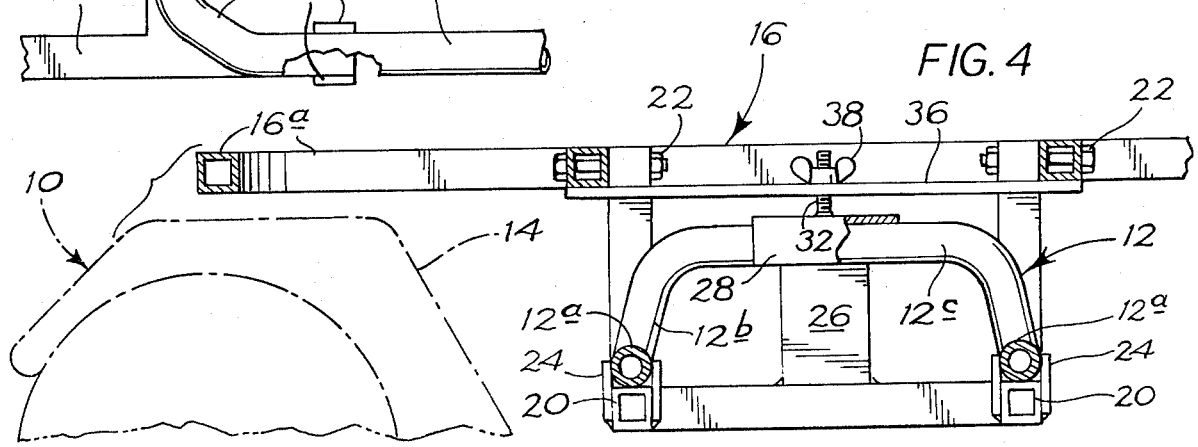
FIG. 4 is a sectional view taken on the line 3—3 of FIG. 3.

With particular reference to the drawings the numeral 10 designates a motorcycle of a type which is in popular use, especially for off-road travel. The motorcycle shown comprises a three-wheel model but it is to be understood that the invention can be applied to other models as well. Pertinent structural parts of the motorcycle as associated with the present rack, however, comprises a longitudinal frame extension 12 at the rear of the motorcycle which generally serves as a handle or as a rack for tying on small articles to be carried. Frmae extension 12 is integral at the front with the motorcycle frame and includes a pair of rearwardly extending parallel portions 12a ending at the rear in an inverted U-shaped portion 12b having a top horizontal connecting portion 12c integral with the portions 12b. The motorcycle has rear fender means 14 shown in broken lines in FIGS. 2 and 4.

The rack of the invention comprises a load carrying platform 16 of suitable shape and size. This platform can be of varying structure, namely, as shown in the drawings it can include an outer peripheral frame member 16a and longitudinal reinforcing frame members 16b. The rack also includes a bracket or mounting member 18 having longitudinal frame members 20 turned up at the rear and connected pivotally at their upper ends to longitudinal frame members 16b of the platform by pivot means 22. Each of the longitudinal frame members 20 of the bracket 18 has a pair of upwardly directed ears 24 at the front forming upwardly opening saddles.

Bracket 18 has an integral upwardly extending post 26 terminating at its upper end in an inverted channel or saddle member 28. A rearwardly projecting finger 30 is secured to the post 26 and this finger integrally supports an upstanding stud 32. Stud 32 extends up through an aperture 34 in a cross bar 36 integral with the platform 16, and this stud is arranged to receive a wing nut 38 for holding the platform in a down position relative to the bracket 18. When the wing nut is removed, the platform can be tilted rearwardly on its pivot connections 22 to the position shown in broken lines in FIG. 2.

The parts 24 and 28 of the rack are dimensioned such that the rack is readily installed by guiding the ears 24 in straddling relation under the respective frame extensions 12a of the motorcycle and then hooking the inverted channel 28 over the top of frame portion 12b. The rack will thus hang fixedly in place, the center of gravity being to the rear of the channel 28 so that the rack will tend to pivot around the saddle for maintaining ears 24 in good engagement with the respective frame portions 12a. The front of the platform lays down on the fenders 14 of the motorcycle for front support, and for this purpose, the platform has a cushioned cross member 40 on its underside at the front to prevent damage to the fenders. The rack can be readily removed by lifting it sufficiently to clear the channel 28 of frame portion 12c and then sliding the rack rearwardly.

It is desired to tilt the platform 16 rearwardly for dumping a load or for other purposes, it is merely necessary to remove the wing nut 38 and raise the front end of the platform.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A carrying rack for motorcycles of the type having a rear frame including spaced longitudinal portions and a horizontal connecting portion between the longitudinal portions, said rack comprising (a) a mounting bracket,
   (b) a top platform supported horizontally on said mounting bracket for holding a load,
   (c) extension means on said mounting bracket arranged to abut up against each of the longitudinal portions of a rear frame of a motorcycle and including pairs of upwardly extending fingers arranged to receive the respective longitudinal portions of the motorcycle frame therebetween for lateral stabilization, (d) and an inverted channel member on said mounting bracket arranged to fit on the horizontal connecting portion of the rear frame of a motorcycle for vertical support, thus combining with said extension means of the bracket and its upwardly extending fingers to hold said rack on the frame of a motorcycle.

2. The carrying rack of claim 1 including pivot means connecting said platform to said mounting bracket to allow said platform to tilt relative to said mounting bracket.

3. The carrying rack of claim 2 including releasable fastening means arranged when fastened to hold said platform fixedly in its horizontal load supporting position and arranged when released to allow said platform to tilt.

4. The carrying rack of claim 1 wherein the center of a gravity of said rack is rearwardly of said channel member whereby said rack holds itself on a frame of a motorcycle by rear weight causing said inverted channel to pivot around the top connecting portion of a motorcycle frame and said extension means to abut up against the longitudinal frame portions of the motorcycle.

5. The carrying rack of claim 1 wherein said top platform has a cushioned undersurface at the front arranged to provide a cushioned load support against a portion of a motorcycle.

* * * * *